US011288871B2

United States Patent
Kim et al.

(10) Patent No.: US 11,288,871 B2
(45) Date of Patent: Mar. 29, 2022

(54) WEB-BASED REMOTE ASSISTANCE SYSTEM WITH CONTEXT AND CONTENT-AWARE 3D HAND GESTURE VISUALIZATION

(71) Applicant: FUJIFILM Business Innovation Corp., Tokyo (JP)

(72) Inventors: Chelhwon Kim, Palo Alto, CA (US); Patrick Chiu, Mountain View, CA (US); Yulius Tjahjadi, Palo Alto, CA (US); Donald Kimber, Foster City, CA (US); Qiong Liu, Cupertino, CA (US)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/678,440

(22) Filed: Nov. 8, 2019

(65) Prior Publication Data
US 2021/0142568 A1    May 13, 2021

(51) Int. Cl.
*G06T 19/00* (2011.01)
*H04L 67/025* (2022.01)
*G06T 13/40* (2011.01)
*G06T 19/20* (2011.01)

(52) U.S. Cl.
CPC ............ *G06T 19/006* (2013.01); *G06T 13/40* (2013.01); *G06T 19/20* (2013.01); *H04L 67/025* (2013.01); *G06T 2215/16* (2013.01); *G06T 2219/024* (2013.01); *G06T 2219/2012* (2013.01)

(58) Field of Classification Search
None
See application file for complete search history.

(56) References Cited

PUBLICATIONS

Seo et al., "Webizing Collaborative Interaction Space for Cross Reality with Various Human Interface Devices", ACM, Jun. 2018. (Year: 2018).*
Melax et al., "Dynamics Based 3D Skeletal Hand Tracking", May 2017. (Year: 2017).*
Groh et al., "Aughanded Virtuality—The Hands in the Virtual Environment", IEEE, 2015 (Year: 2015).*
You et al., "Hybrid Inertial and Vision Tracking for Augmented Reality Registration", IEEE. 2002 (Year: 2002).*
Ko et al., "Introduction of Physics Simulation in Augmented Reality", IEEE, 2008. (Year: 2008).*
Arcore. https://developers.google.com/ar/. Accessed: Jun. 3, 2019.
Arkit. https://developer.apple.com/augmented-reality/. Accessed: Jun. 3, 2019.
Colmap. https://colmap.github.io/. Accessed: Jun. 3, 2019.
OpenCV. https://opencv.org/. Accessed: Jun. 3, 2019.

(Continued)

*Primary Examiner* — Nicholas R Wilson
(74) *Attorney, Agent, or Firm* — Procopio, Cory, Hargreaves & Savitch LLP

(57) ABSTRACT

Example implementations described herein are directed to the transmission of hand information from a user hand or other object to a remote device via browser-to-browser connections, such that the hand or other object is oriented correctly on the remote device based on orientation measurements received from the remote device. Such example implementations can facilitate remote assistance in which the user of the remote device needs to view the hand or object movement as provided by an expert for guidance.

18 Claims, 12 Drawing Sheets

(56) References Cited

PUBLICATIONS

Scope AR. https://www.scopear.com/. Accessed: Jun. 3, 2019.
Teamviewer pilot. https://www.teamviewer.com/en-us/solutions/augmented-reality-remote-support/#gref. Accessed: Jun. 3, 2019.
Upskill skylight. https://upskill.io/skylight/. Accessed: Jun. 3, 2019.
ViewAR. https://www.viewar.com/. Accessed: Jun. 3, 2019.
Vuzix remote assist. https://www.vuzix.com/Vuzix-Remote. Accessed: Jun. 3, 2019.
Alem, L. et al. "Remote Tele-assistance System for Maintenance Operators in Mines" 2011 Underground Coal Operators' Conference, Feb. 10-11, 2011 (8 pages).
Amores, J. et al. "ShowMe: A Remote Collaboration System that Supports Immersive Gestural Communication" CHI, 2015, Apr. 18-23, 2015, Seoul, Republic of Korea, pp. 1343-1348.
Huang, W. et al. "HandsInAir: A Wearable System for Remote Collaboration" Proceedings of the 2013 conference on Computer supported cooperative work companion, 2013, pp. 153-156.
Huang, W. et al. "HandsIn3D: supporting remote guidance with immersive virtual environments", IFIP Conference on Human-Computer Interaction, 2013, pp. 70-77.
Kirk, D. et al. "Turn It This Way: Grounding Collaborative Action with Remote Gestures" CHI 2007 Proceedings, Distributed Interaction, Apr. 28-May 3, 2007, San Jose, CA, USA (11 pages).
Sodhi, R. et al. "BeThere: 3D Mobile Collaboration with Spatial Input" CHI 2013: Changing Perspectives, Apr. 27-May 2, 2013, pp. 179-188, Paris, France.
Fussell, S. et al. "Gestures Over Video Streams to Support Remote Collaboration on Physical Tasks" Human-Computer Interaction, 2004, vol. 19, pp. 273-309.
Chen, S. et al. "SEMarbeta: Mobile Sketch-Gesture-Video Remote Support for Car Drivers" 4th Augmented Human International Conference, Mar. 7-8, 2013, pp. 69-76, Stuttgart, Germany.
Kunz, A. et al. "CollaBoard: A Novel Interactive Electronic Whiteboard for Remote Collaboration with People on Content" 2010 International Conference on Cyberworlds, Oct. 2010, pp. 430-437 (9 pages).
Kim, S. et al. "The Effect of Collaboration Styles and View Independence on Video-mediated Remote Collaboration" Journal Computer Supported Cooperative Work, Dec. 2018, vol. 27 Issue 3-6 (43 pages).
Huang, W. et al. "Sharing hand gesture and sketch cues in remote collaboration" Journal of Visual Communication Image Representatuion, Dec. 8, 2018, vol. 58, pp. 428-438.

\* cited by examiner

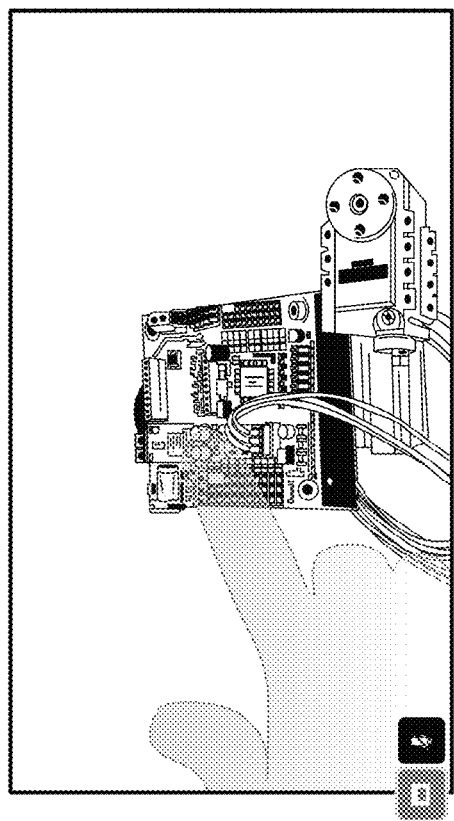
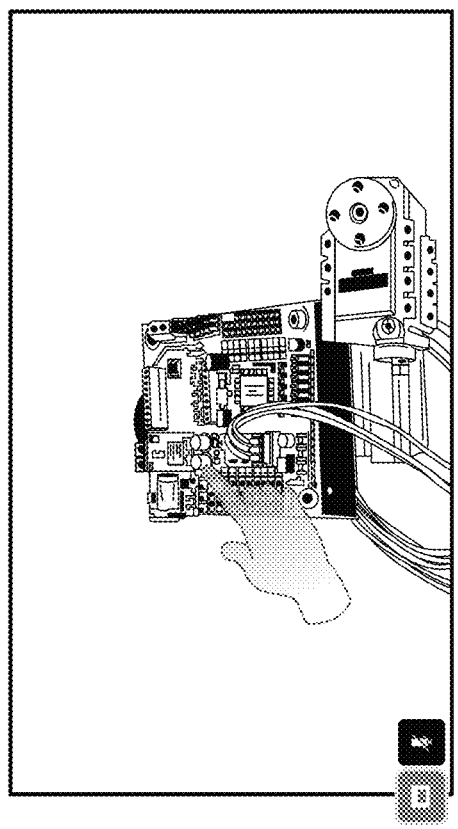
FIG. 7(a)
FIG. 7(b)

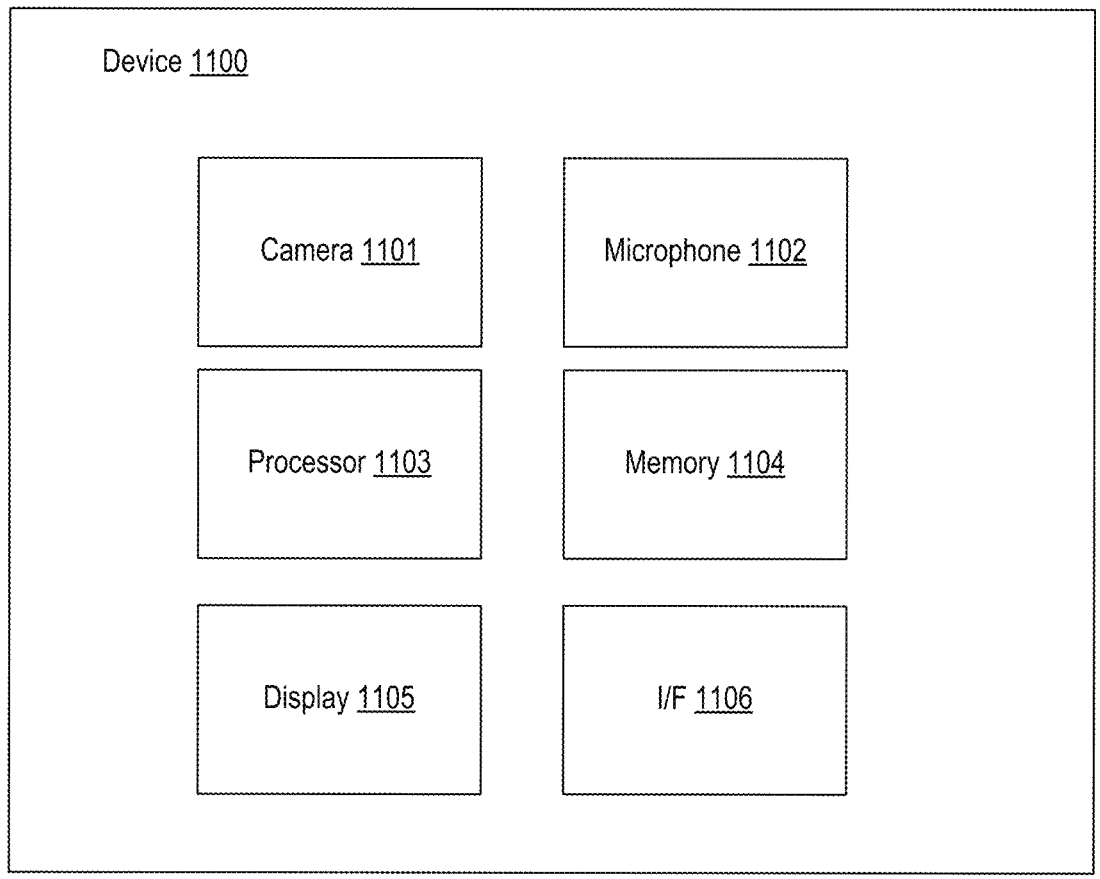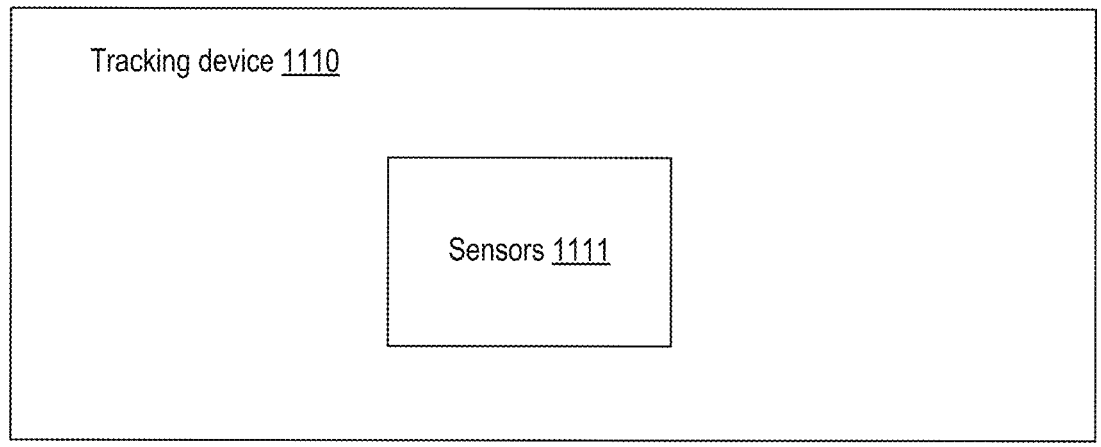
FIG. 11

WEB-BASED REMOTE ASSISTANCE SYSTEM WITH CONTEXT AND CONTENT-AWARE 3D HAND GESTURE VISUALIZATION

BACKGROUND

Field

The present disclosure is generally directed to remote assistance systems, and more specifically, to real time video based gesture assistance systems.

Related Art

Current related art video conference technology allows people to keep collaborating even when they are in different locations. However, in remote assistance scenarios in which a remote expert is helping a local customer to perform a complex physical task, the guidance conveyed by using the video and audio communication media of the related art result in a high risk of misinterpretation of the intention and instruction from the expert, which can lead to an inefficient collaboration experience and performance.

In the related art, non-verbal communications such as body languages and hand gestures can significantly improve the performance of remote collaboration activities in remote assistance/collaboration scenarios. The effectiveness of using the hand gestural visual cue in remote assistance/collaboration scenarios has been tested in related art implementations.

SUMMARY

However, such related art implementations do not incorporate context and content information. Example implementations described herein consider several context and content aspects that can be captured by analyzing the view of the customer work space. Such analysis can be used to change visualization parameters of the hand model such as its size, orientation, or color, which can lead to a better collaboration experience and an increase in task performance.

Example implementations described herein involve a remote assistance system that facilitates a remotely located expert to provide guidance using hand gestures to a customer who performs a physical task in a different location. The system is built on top of a web based real-time media communication framework which allows the customer to use a commodity smartphone to send a live video feed to the expert, from which the expert can see the view of the customer work space and show their hand gestures over the video in real-time. The hand gesture of the expert is captured with a hand tracking device and visualized with a rigged three dimensional (3D) hand model on the live video feed. The system can be accessible via a web browser, and does not require any prerequisite software to be installed on the customer device. The system improves the collaboration experience by utilizing the context and content information on the customer environment for visualization aspects of the hand model (e.g., orientation, scale and color, etc.), and for navigation guidance based on audio cues. The system also supports capture and playback of hand movements.

In example implementations described herein, there is a light weight web-based system that supports remote guidance using hand gestures from a remotely located expert to a local customer. Through the use of web based real-time media communication technology (e.g. WebRTC), the system allows the local customer to use a commodity smartphone device to share a view of the customer work space with the remote expert helper via a video conference, and the hand gesture data from the expert can be transmitted and visualized in real-time on the shared live video stream in the web browser. Since the system can be accessible via major modern web browsers from end users by simply browsing the specified web page, it does not require any prerequisite software to be installed on user smartphone devices. The system on the expert side utilizes a tracking device (e.g., hand tracking device) to track the hand movement of the expert. Additionally, example implementations described herein are not limited to hand tracking, but can be also extended to other types of tracking (e.g., foot, tool) in accordance with the desired implementation.

Aspects of the present disclosure can involve a non-transitory computer readable medium, storing instructions for executing a process for a mobile device that includes an orientation sensor and a camera, the instructions involving transmitting video from the camera and measurements from the orientation sensor to another device; receiving hand information associated with a user hand from the another device; and overlaying a representation of the user hand on the video for display by the mobile device based on the hand information, the representation of the user hand overlaid on the video in an orientation determined from the measurements from the orientation sensor.

Aspects of the present disclosure can involve a method for executing a process for a mobile device involving an orientation sensor and a camera, the instructions involving transmitting video from the camera and measurements from the orientation sensor to another device; receiving hand information associated with a user hand from the another device; and overlaying a representation of the user hand on the video for display by the mobile device based on the hand information, the representation of the user hand overlaid on the video in an orientation determined from the measurements from the orientation sensor.

Aspects of the present disclosure can involve a mobile device involving an orientation sensor a camera, and a processor involving instructions for transmitting video from the camera and measurements from the orientation sensor to another device; receiving hand information associated with a user hand from the another device; and overlaying a representation of the user hand on the video for display by the mobile device based on the hand information, the representation of the user hand overlaid on the video in an orientation determined from the measurements from the orientation sensor.

Aspects of the present disclosure can involve a mobile device involving orientation sensor means, camera means, means for transmitting video from the camera and measurements from the orientation sensor to another device; means for receiving hand information associated with a user hand from the another device; and means for overlaying a representation of the user hand on the video for display by the mobile device based on the hand information, the representation of the user hand overlaid on the video in an orientation determined from the measurements from the orientation sensor.

Aspects of the present disclosure can involve a non-transitory computer readable medium, storing instructions for executing a process for a device communicatively coupled to a tracking device, the instructions involving receiving video and orientation sensor measurements from a mobile device; transmitting hand information from the device associated with a user hand from the another device, the hand information generated based on measurements obtained from the tracking device; and overlaying a representation of the user hand on the video for display by the device based on the hand information, the representation of the user hand overlaid on the video in an orientation determined from the measurements from the orientation sensor.

Aspects of the present disclosure can involve a method for a device communicatively coupled to a tracking device, the method involving receiving video and orientation sensor measurements from a mobile device; transmitting hand information from the device associated with a user hand from the another device, the hand information generated based on measurements obtained from the tracking device; and overlaying a representation of the user hand on the video for display by the device based on the hand information, the representation of the user hand overlaid on the video in an orientation determined from the measurements from the orientation sensor.

Aspects of the present disclosure can involve a device communicatively coupled to a tracking device, the device involving a processor configured to execute instructions involving receiving video and orientation sensor measurements from a mobile device; transmitting hand information from the device associated with a user hand from the another device, the hand information generated based on measurements obtained from the tracking device; and overlaying a representation of the user hand on the video for display by the device based on the hand information, the representation of the user hand overlaid on the video in an orientation determined from the measurements from the orientation sensor.

Aspects of the present disclosure can involve a device communicatively coupled to a tracking device, the device involving means for receiving video and orientation sensor measurements from a mobile device; means for transmitting hand information from the device associated with a user hand from the another device, the hand information generated based on measurements obtained from the tracking device; and means for overlaying a representation of the user hand on the video for display by the device based on the hand information, the representation of the user hand overlaid on the video in an orientation determined from the measurements from the orientation sensor.

Aspect of the present disclosure involve a non-transitory computer readable medium, storing instructions for a server, the instructions involving receiving a first connection from a mobile device; receiving a second connection from another device communicatively coupled to a tracking device; establishing a third connection between the mobile device and the another device to facilitate transmission of video and orientation sensor measurements from the mobile device to the another device and to facilitate transmission of hand information from the another device to the mobile device.

Aspect of the present disclosure involve a method involving receiving a first connection from a mobile device; receiving a second connection from another device communicatively coupled to a tracking device; establishing a third connection between the mobile device and the another device to facilitate transmission of video and orientation sensor measurements from the mobile device to the another device and to facilitate transmission of hand information from the another device to the mobile device.

Aspect of the present disclosure involve a server involving means for receiving a first connection from a mobile device; means for receiving a second connection from another device communicatively coupled to a tracking device; means for establishing a third connection between the mobile device and the another device to facilitate transmission of video and orientation sensor measurements from the mobile device to the another device and to facilitate transmission of hand information from the another device to the mobile device.

BRIEF DESCRIPTION OF DRAWINGS

FIGS. 7(a) and 7(b) illustrate an example of adjustments to the finger size, in accordance with an example implementation.

FIG. 11 illustrates an example of a system involving a tracking device, in accordance with an example implementation.

DETAILED DESCRIPTION

Figure 1:
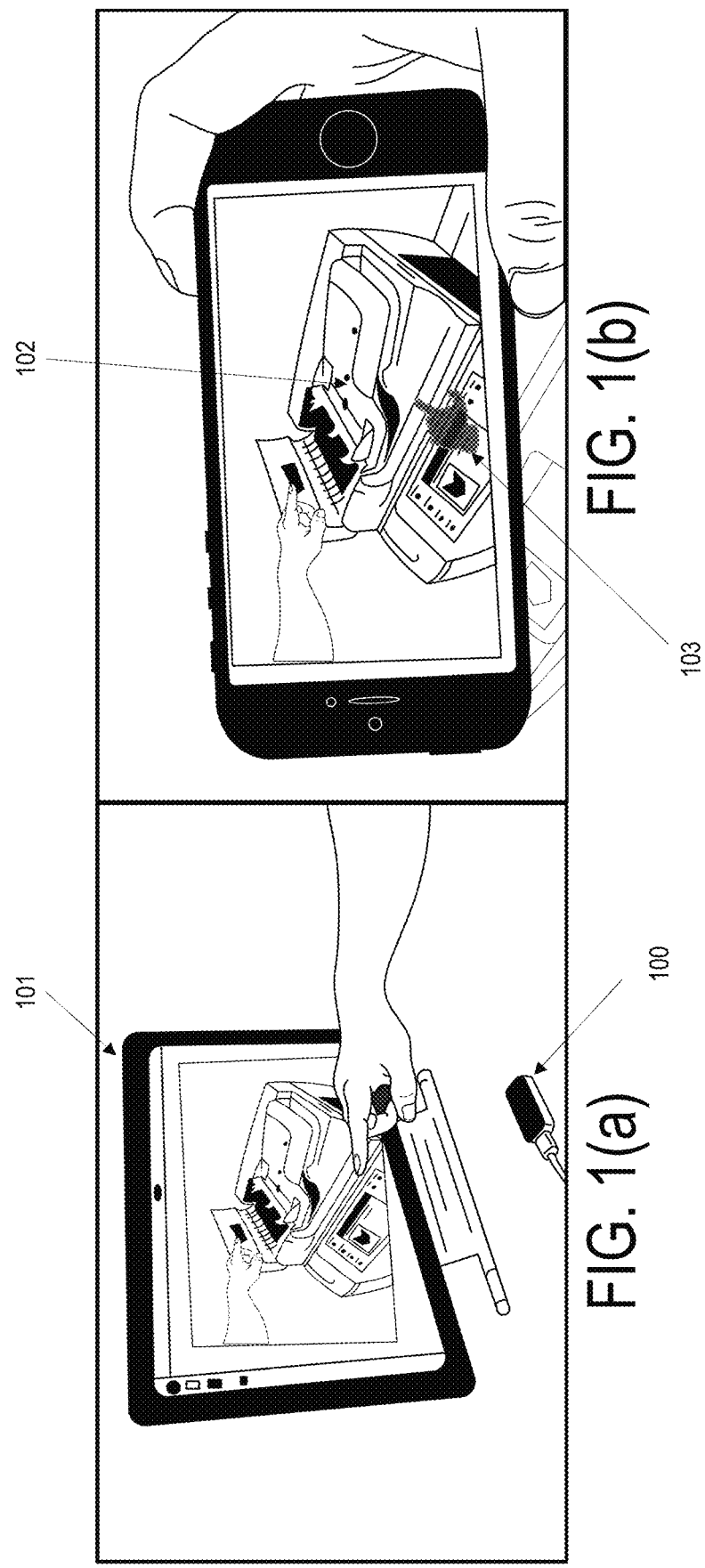
FIGS. 1(a) and 1(b) illustrates an example system, in accordance with an example implementation.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

Described herein is a web based remote assistance system wherein different aspects of context and content are used to enhance the hand gesture visualization and other visualization.

FIGS. 1(a) and 1(b) illustrates an example system, in accordance with an example implementation. Specifically, FIG. 1(a) illustrates the setup for the expert system, and FIG. 1(b) illustrates the setup for the customer system. In FIG. 1(a), a remote expert watches a live video feed sent from a customer and move his/her hand over a tracking device 100 to provide hand gesture based guidance. In FIG. 1(b), a customer uses a smartphone to share the view of the customer work space and an object (printer 102) therein and is instructed by viewing the expert hand movement 103 on the smartphone screen.

A remote expert uses a tracking device 100 (e.g., configured to track hand, tool, etc.)) placed on a desk with the computer monitor 101 in front of the tracking device 100. A live video feed sent from a customer camera (e.g., from smartphone device illustrated in FIG. 1(b)) is displayed on the monitor 101, from which the expert can view the customer work space and objects therein in real-time (e.g. the printer 102 in FIG. 1(b)). By viewing the live video and performing interactions over the tracking device 100, the expert provides hand/tool gesture based guidance to the customer (e.g. guidance to check the document feeder roller with pointing gesture). In an example implementation involving hand gestures, the hand gesture is visualized with a rigged 3D hand model 103 with a translucent effect on the video that is displayed simultaneously on both expert and customer devices. By viewing the hand visualization 103 from the expert over the smartphone screen as in FIG. 1(b), the customer can be instructed on a physical task related to the object (e.g. checking the message on the printer monitor, checking the document feeder roller, etc.).

Figure 2:
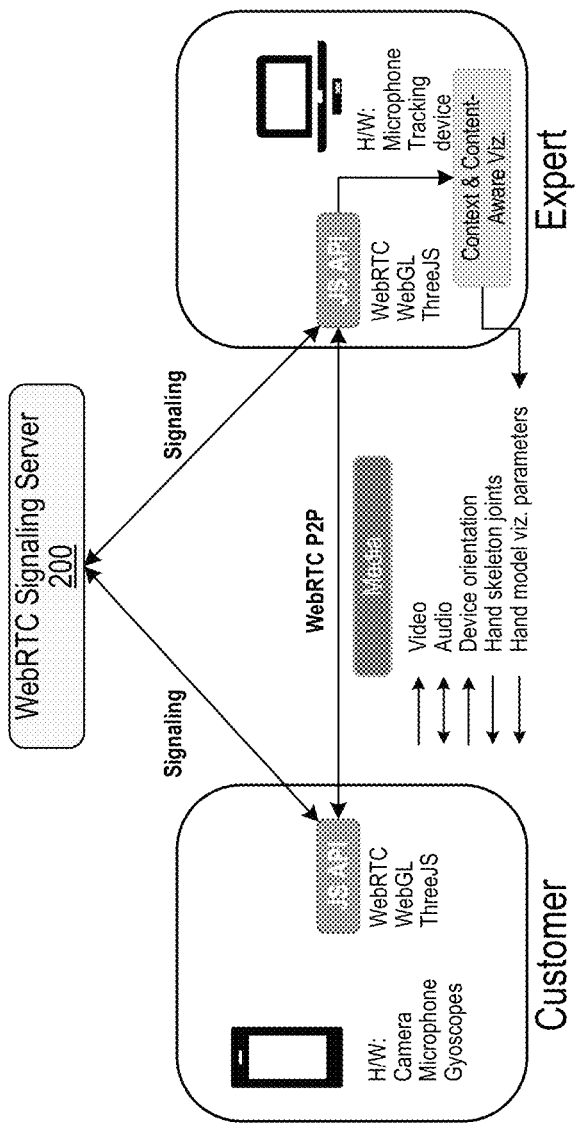
FIG. 2 illustrates the web-based real-time communication framework of the system, in accordance with an example implementation.

FIG. 2 illustrates the web-based real-time communication framework of the system, in accordance with an example implementation. As depicted in FIG. 2, the system is built on a web real-time communication framework (WebRTC). The intermediary signaling server 200 in WebRTC establishes a peer-to-peer (P2P) connection between the customer and the expert for real-time media communication, and each end user can participate this direct media communication session by browsing a web page hosted by the server using any compatible modern web browsers known in the related art. Further description of the customer device is provided in FIG. 10. Further description of the expert system is provided in FIG. 11. As will be described herein and as illustrated in FIG. 2, the P2P connection facilitates the exchange of information, such as video (e.g., live), device orientation, audio, hand skeleton joints, and hand model visualization parameters.

Figure 3:
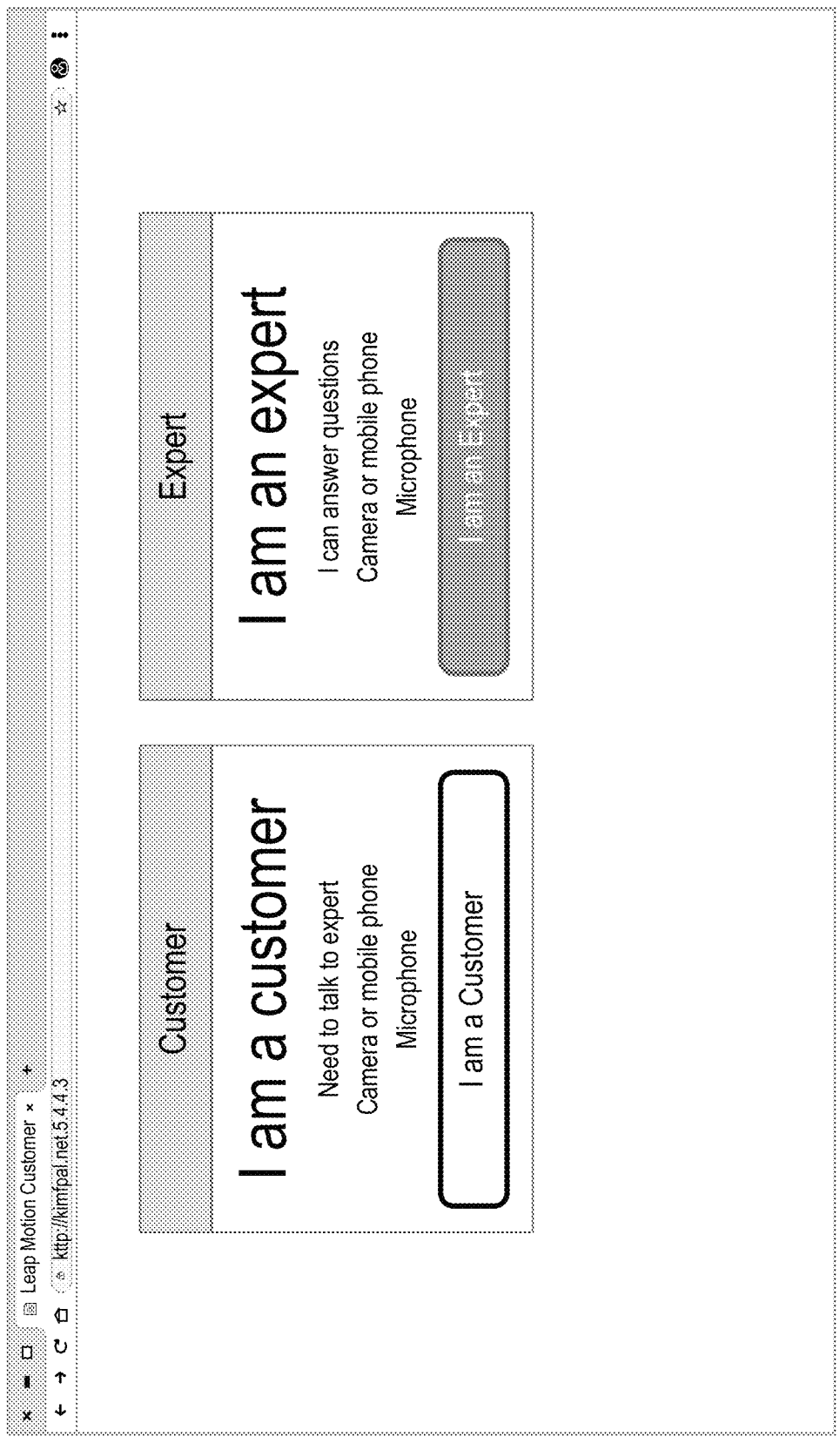
FIG. 3 illustrates an example web page from which users can initiate the session, in accordance with an example implementation.

FIG. 3 illustrates an example web page from which users can initiate the session, in accordance with an example implementation. Since the data communication between two peers and the data access to the user devices (e.g., camera, microphone, tracking device) are controlled by the WebRTC and JavaScript Application Programming Interfaces (APIs) residing in the user web browsers, example implementations described herein does not require any prerequisite software or plugins to be installed for their devices or browsers.

To create and display the 3D hand model in the user web browser in real-time, example implementations described herein utilize Three.js API that is based on WebGL. Three.js uses the JavaScript language as part of the website, and thus it does not require the need for installing any web browser plugins. The hand skeleton joints data obtained from the tracking device of the expert are used for rigging the 3D hand model in the Three.js scene. In order to synchronize the perspective view of the rendered 3D hand model and its pose between the customer and the expert, the hand skeleton joints data and hand model visualization parameters provided from the Three.js perspective camera parameters (e.g. field of view, view direction, position, etc.) are set at the expert side, and then transmitted to the customer side, as indicated by the arrows illustrating the data flow between customer and expert in FIG. 2. The transmitted hand skeleton joints data and the Three.js camera parameters are used for rigging and displaying the hand model of the customer in the same perspective view on the customer web browser. In example implementations, the 3D hand model data is embedded in the web page so that the system does not need to send the large 3D mesh data to the customer, instead only small amount of the hand skeleton joints and the camera parameters are transmitted to the customer.

The proposed system also can utilize context and content information on the customer environment and the target object to change visualization aspects of the hand model such as its color, size, or orientation. Such visualization and utilization of context and content is managed by a context and content-aware visualization module in the expert side that processes both the transmitted media data from the customer and the data captured from the expert devices, and produces the updated visualization parameters of the hand model that is transmitted and applied to the customer hand model.

Figure 4C:
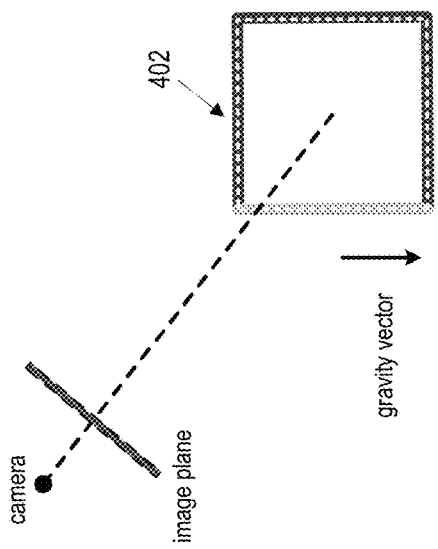
FIGS. 4(a) to 4(c) illustrate an interaction box and corresponding alignment, in accordance with an example implementation.
Figure 4B:
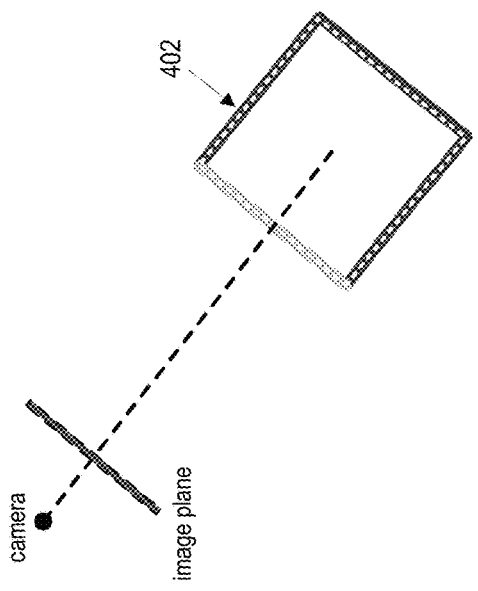
Figure 4A:
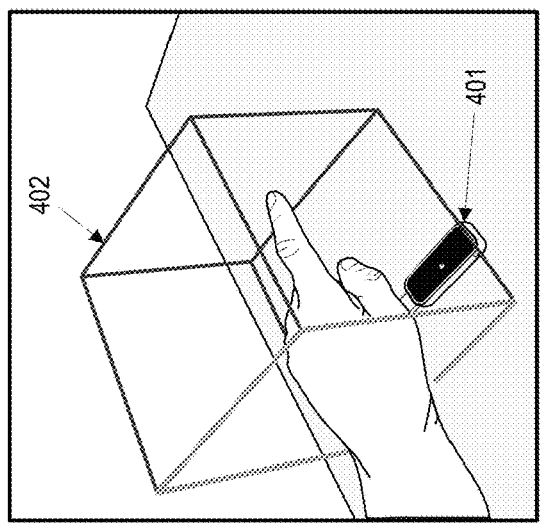

FIGS. 4(a) to 4(c) illustrate an interaction box and corresponding alignment, in accordance with an example implementation. Specifically, FIG. 4(a) illustrates an example interaction box over the tracking device of the expert system, FIG. 4(b) illustrates an example of aligning the sensor interaction space to the customer camera view space, and FIG. 4(c) illustrates an example of a gravity-aware alignment of the interaction space.

In example implementations described herein, a precise positioning of the virtual hand of the expert with respect to the real environment and objects of interest therein of the customer is important for the expert to convey accurate guidance and information on the required physical operations on the objects. To facilitate such example implementations, a proper alignment between the interaction space (and thus the virtual hand therein) of the tracking device of the expert, and the customer camera view space is utilized. In example implementations described herein, there is 1) context-aware alignment of the interaction space based on the gravity direction of the customer environment to snap the interaction space onto the ground of the real world of the customer, which helps the expert manipulate the virtual hand in a more intuitive and natural way as they would present physically in the customer environment; 2) content-aware alignment based on the visual appearance of the customer scene and the objects to change the scale or color of the virtual hand, which helps the customer follow the expert instruction by viewing the movement of the virtual hand with the right scale and the salient color in relation to the objects.

The aspect of the context that is considered is the camera view orientation of the customer with respect to the customer environment to align the virtual hand from the expert to the physical world of the customer. Such example implementations help the expert to perform more natural and intuitive interaction with the sensor of the tracking device, where the expert can move his hand as if he were physically present in the customer work space. More precisely, example implementations estimate the direction of the gravity of the customer work space using inertial sensors in the customer smartphone, and use it to continuously change the orientation of the interaction space in the customer camera view space (and thus the virtual 3D hand model therein) and its relative pose to the ground of the customer work space is stabilized while the customer can freely move their handheld camera.

FIG. 4(a) illustrates an interaction space as a 3D box representation 402 over the tracking device 401. The front face of the box can be color encoded or color/greyscale encoded (e.g., with red or red hues). FIG. 4(b) illustrates an example of registering the interaction space to the customer camera without the gravity-awareness, in which the interaction space is placed in front of the camera, and its canonical axes are aligned to the ones of the camera.

FIG. 4(c) shows the gravity-aware registration by aligning the interaction space's vertical axis to the direction of the gravity in the customer's camera space. With this gravity-aware alignment, the movement from the real hand of the expert in his physical world matches to the one of the virtual hand model in the physical world of the customer, and this helps the expert to easily and intuitively perform the interaction on the tracking device to manipulate the virtual hand in the customer camera view space.

Figures 5A, 5B, 5C:
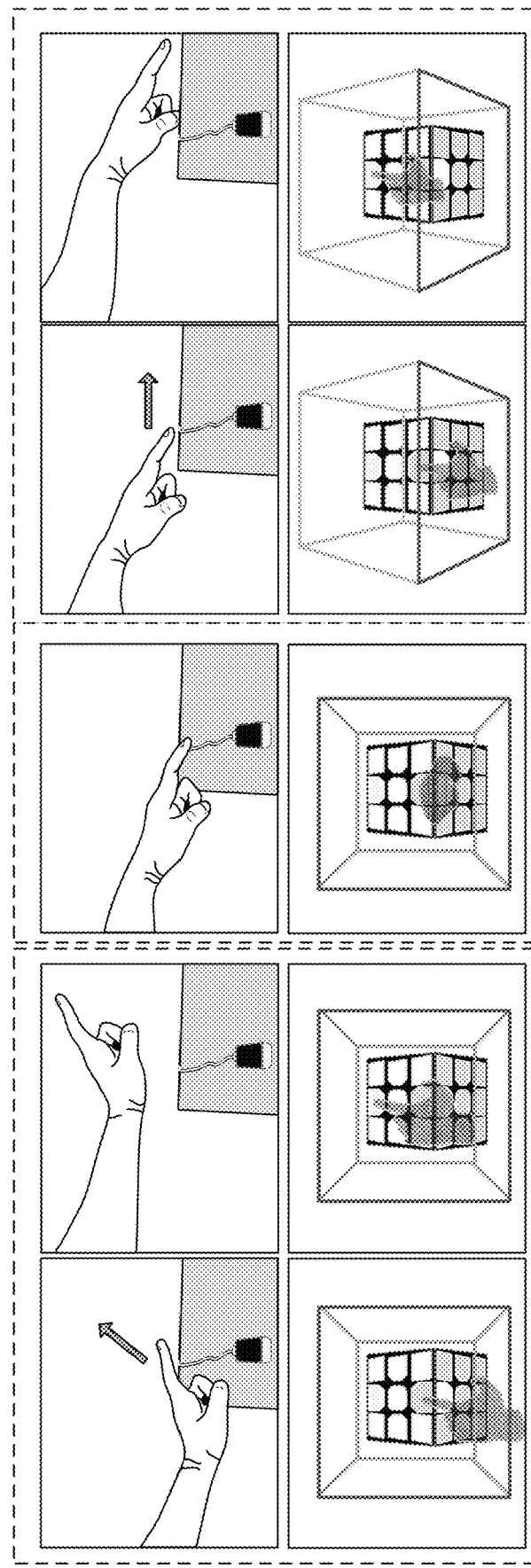
FIGS. 5(a) to 5(c) illustrate example visualizations of a pointing gesture and the interaction space in various configurations in accordance with example implementations.

FIGS. 5(a) to 5(c) illustrate example visualizations of a pointing gesture and the interaction space in various configurations in accordance with example implementations. Specifically, FIGS. 5(a) and 5(c) illustrate the hand movement over the tracking device in the expert environment (top boxes) to manipulate his virtual hand to point to the top edges of the cube in the customer workspace (bottom boxes). The top boxes in FIGS. 5(a) and 5(c) represent a pointing gesture made over the tracking device. The bottom boxes in FIGS. 5(a) and 5(c) illustrate the visualization of the 3D hand model and the interaction box representation superimposed on the view of the customer.

Without the gravity-aware alignment, the expert often moves his hand upward diagonally to bring the index finger tip of the virtual hand from the towards the top edge of the cube (FIG. 5(a)) while he watches his virtual hand movement rendered over the live video feed. With the gravity-aware alignment, the expert can move his hand in the same way as he would as if he presented physically in the customer work space and moved his hand in parallel to the top edge of the cube (FIG. 5(c)).

Another limitation of the registration of the interaction space without the gravity-awareness is that it often leads to unpleasant visualization of the hand in the pointing gesture especially when the palm of the hand is approximately parallel to the sensor. For example, FIG. 5 (b) shows that the index finger tip of the model is occluded by its palm and other fingers due to the camera viewpoint which is right behind the hand model. To address this, the expert has to purposely rotate his hand to show a complete view of the index finger of the virtual hand as in the top boxes of FIG. 5(a). However, this also often makes the expert move his hand too closely to the sensors of the tracking device, causing difficulty in the tracking pose with fewer visual cues for the sensor (e.g. the index finger can be occluded by the other fingers from the view of the tracking device as in the top boxes of FIG. 5(a)), which can decrease the tracking performance.

Example implementations are further configured to adapt the hand appearance and size based on the content of the objects being viewed.

Figure 6A:
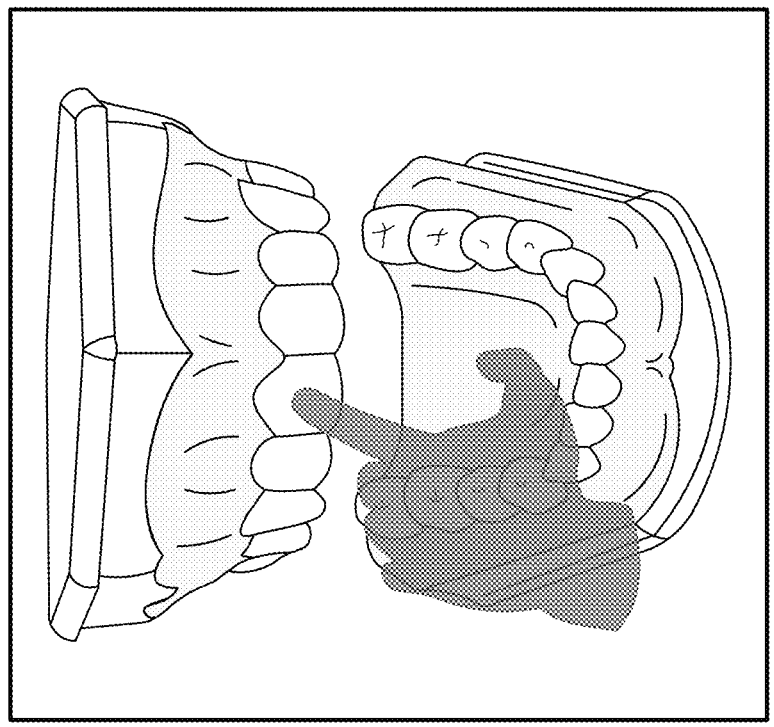
FIGS. 6(a) and 6(b) illustrate an adaptive coloring or shading in accordance with an example implementation.
Figure 6B:
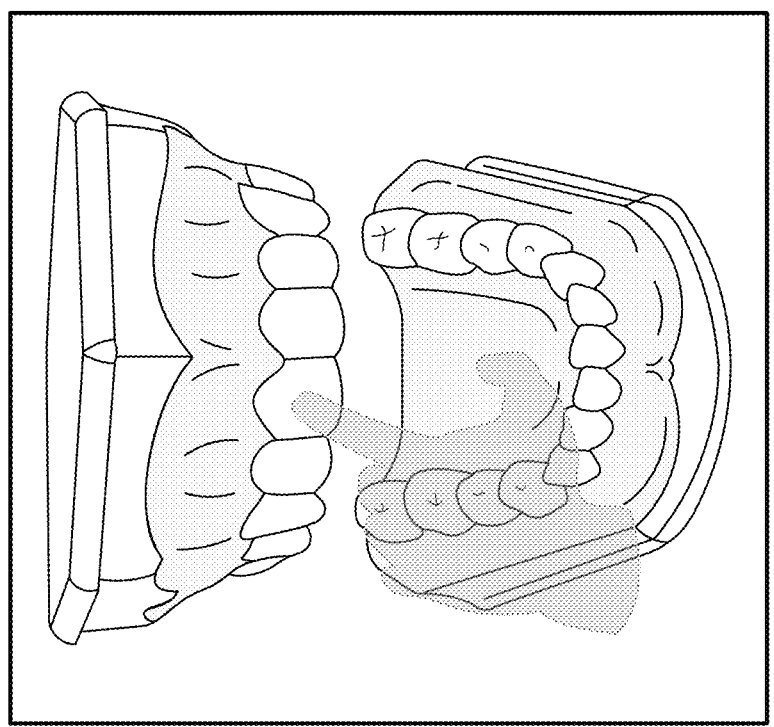

FIGS. 6(a) and 6(b) illustrate an adaptive coloring or changing of contrast in accordance with an example implementation. Depending on the desired implementation, the contrast of the virtual hand to the background can be adjusted by adjusting its highlight color on some or all portions of the hand based on the color of the background/objects. In the example of FIGS. 6(a) and 6(b), all portions of the hand are adjusted, however, portions (e.g., thumb and index fingers only) can be adjusted instead in accordance with the desired implementation. FIGS. 6(a) and 6(b) illustrates the adapted virtual hand appearance overlaid on the plastic teeth model by changing its contrast, which makes the hand more stand out from the background. Alternatively, depending on the desired implementation, the highlight color can also be changed (e.g., from red to blue) in accordance with the desired implementation. In such an example implementation to select the highlight color of the hand, the average hue value in the camera image near the virtual hand can be obtained, and the complementary hue value is utilized for the contrast. Thus, in an example implementation, the hue value of the hand model is adapted from the red to blue color to enhance its visibility.

FIGS. 7(a) and 7(b) illustrate an example of adjustments to the finger size, in accordance with an example implementation. By performing content analysis on the 2D canvas image of the camera feed inside the web browser window, example implementations can adapt the size of the finger based on the estimated size of the objects in the vicinity of the pointing forefinger. For example, in FIG. 7(a), the finger is too large and it is difficult to see which of the two objects on the circuit board is being pointed at. In FIG. 7(b), the finger size is adjusted and it is clear the left object is the target object.

Figure 8B:
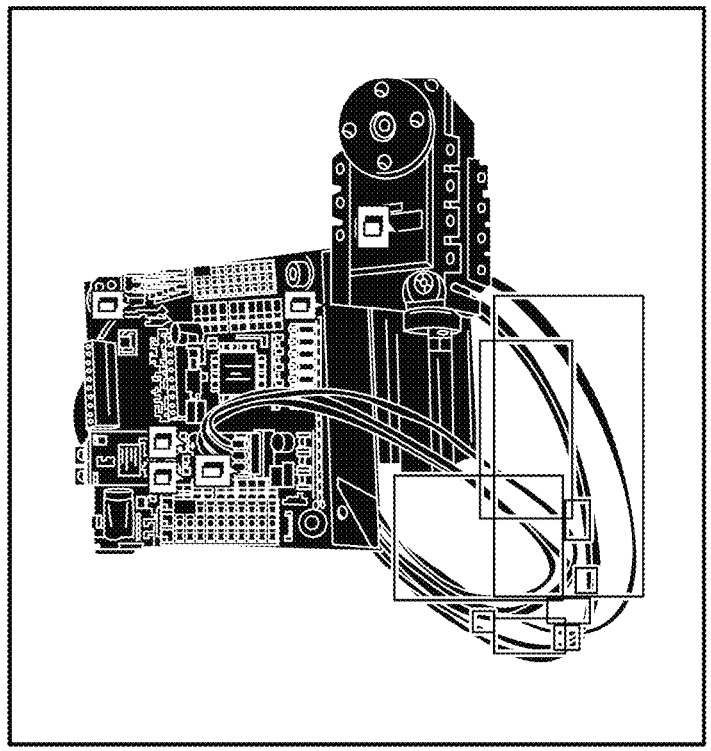
FIGS. 8(a) and 8(b) illustrate examples of detected blobs with corresponding bounding boxes highlighted, in accordance with an example implementation.
Figure 8A:
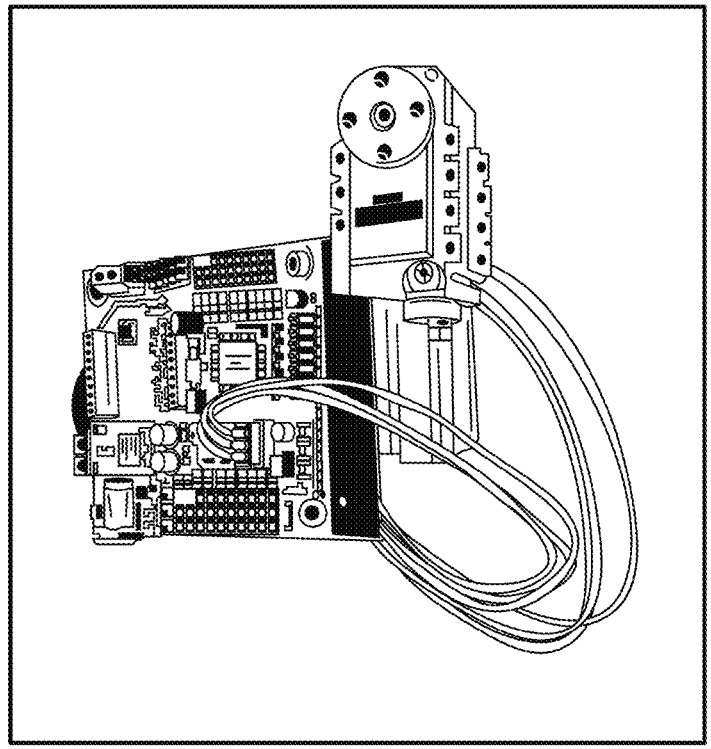

FIGS. 8(a) and 8(b) illustrate examples of detected blobs with corresponding bounding boxes highlighted, in accordance with an example implementation. To estimate the size of the objects in the neighborhood of the finger, example implementations apply blob detection. One example process of blob detection is to use contour detection on a thresholded binarized image. The result of applying a thresholded binarized image to the imagery of FIG. 8(a) shown in FIG. 8(b), in which detected objects and their sizes in the neighborhood of the pointing finger in FIGS. 7(a) and 7(b) are shown as bounded boxes. Then, the finger size can be adjusted by scaling it to be the average size of the detected objects in the neighborhood.

In another example implementation to adapt the size of the hand in the image, the 3D position of the object in the real world space can be estimated, whereupon the virtual hand is placed near the object so that the scale of the hand in the camera image is automatically adjusted based on the distance between the camera and the object (or the hand placed nearby). The 3D position of the object in the space can be estimated by reconstructing the 3D model of the scene (including the object) from a sequence of camera images using Structure from Motion (SfM) techniques as known to one of ordinary skill in the art, or deep learning-based depth map estimation methods in accordance with the desired implementation. Another approach is to directly obtain the 3D pose of the object with respect to a pre-built 3D reference model. The model is composed of a 3D point cloud by using SfM and each 3D point is associated with a local feature descriptor. By establishing 2D-3D local feature matches between the camera image of the object and the reference model and solving a Perspective-n-Point (PnP) problem) based on the matches, the six degrees of freedom pose of the object can be obtained.

Example implementations can further provide context-aware audio cues in accordance with the desired implementation. In an example implementation, there can be a type of setup facilitates the expert to navigate in a reconstructed 3D environment, based on synthesizing the scene as the customer moves the smartphone around. This effectively extends the field of view of the customer smartphone.

Additionally, example implementations can be configured to address problems in which the hand movements of the expert are outside the field of view of the customer smartphone. To help the customer guide the smartphone toward the viewpoint to see the hand movements, since the expert is doing hand pointing or speaking, it can be better to use another modality. One technique is to use audio cues to indicate the direction where the expert hand is currently present. The system determines the relative direction and synthesizes a stereo signal that is added to the video stream transmitted to the customer. Using stereo headphones, the customer can hear which direction to move the smartphone to see the hand movements of the expert.

Figure 9:
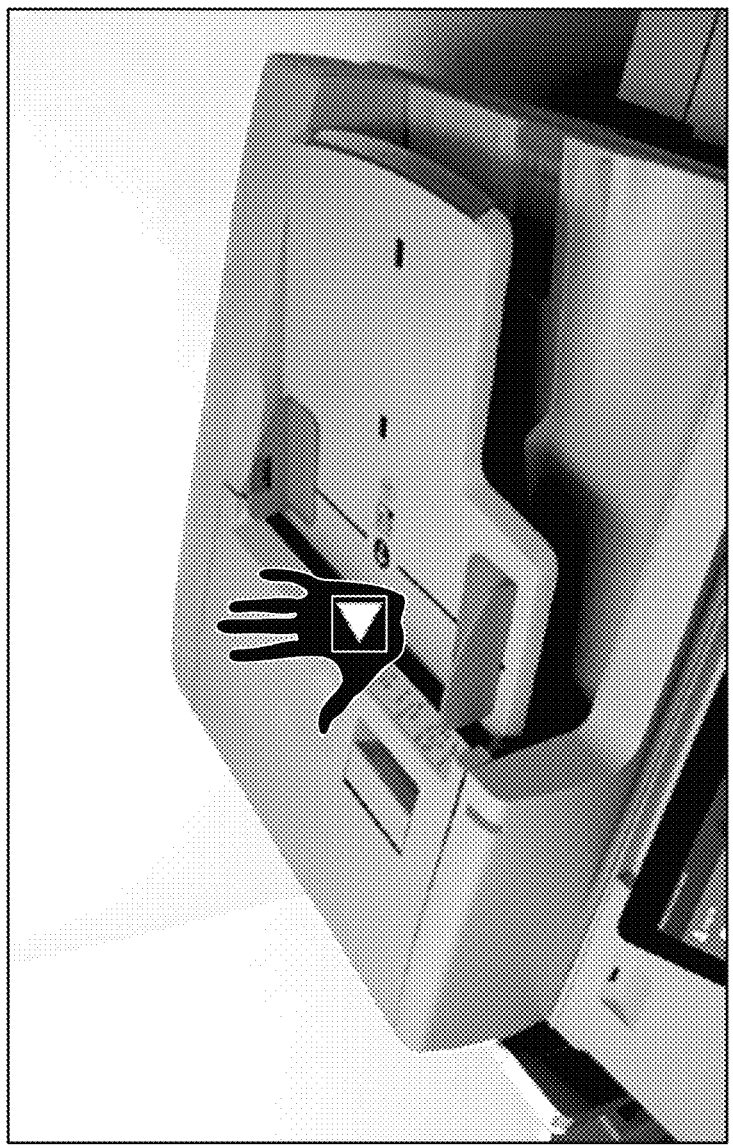
FIG. 9 illustrates an example of playback functionality for an object to access previously captured manipulations, in accordance with an example implementation.

FIG. 9 illustrates an example of playback functionality for an object to access previously captured manipulations, in accordance with an example implementation. Specifically, FIG. 9 facilitates such functionality by provided a playback icon. Example implementations can further facilitate the capture and playback of hand movements in accordance with the desired implementation. Oftentimes, customers have the same question about a particular issue. An example is the task of cleaning the roller of a printer. To save the cost of repeatedly making use of an expert person's time, the task can be captured by recording the frames of the rendered hand manipulations, and later played back by a customer. An example scenario would be for the customer to point the smartphone at the target object. The system recognizes the object, and if there is a captured task associated it will display an icon rendered on top of the current smartphone camera view as illustrated in FIG. 9. The customer can then tap on the icon to playback the hand manipulations rendered on top of the current smartphone camera view. In such example implementations, both the video and the orientation sensor measurements or orientation measurements can be stored for later use and processing by the expert system, so that the video playback is associated with the recorded orientation measurements.

Example implementations differ from the related art through the use of a web-based system which does not require any special applications or plug-ins to be installed on the customer device or web browsers, and can be accessible for use on any device connected to the internet with most web browsers known to one of ordinary skill in the art.

Example implementations further facilitate context and content-aware hand visualization, in that the visual aspects of the hand model such as pose, color, scale etc. is adapted by the context and content information on the customer environment and the target objects.

Figure 10:
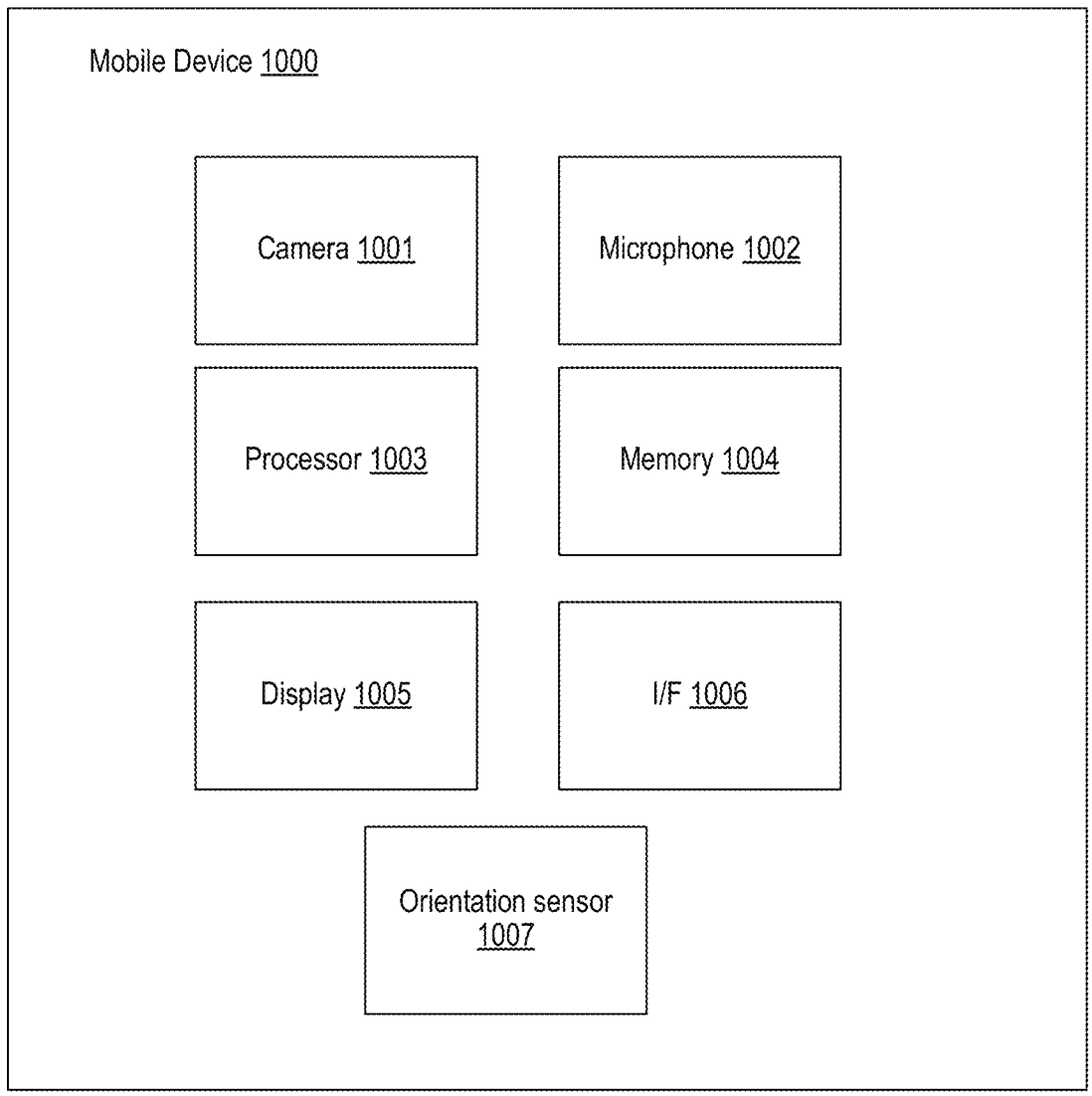
FIG. 10 illustrates an example of a mobile device, in accordance with an example implementation.

FIG. 10 illustrates an example of a mobile device, in accordance with an example implementation. Mobile device 1000 can include camera 1001, microphone 1002, processor 1003, memory 1004, display 1005, interface (I/F) 1006 and orientation sensor 1007. Camera 1001 can include any type of camera that is configured to record any form of video in accordance with the desired implementation. Microphone 1002 can involve any form of microphone that is configured to record any form of audio in accordance with the desired implementation. Display 1005 can involve a touch screen display configured to receive touch input to facilitate instructions to execute the functions as described herein, or a normal display such as a liquid crystal display (LCD) or any other display in accordance with the desired implementation. I/F 1006 can include network interfaces to facilitate connections of the mobile device 1000 to external elements such as the server and any other device in accordance with the desired implementations. Processor 1003 can be in the form of hardware processors such as central processing units (CPUs) or in a combination of hardware and software units in accordance with the desired implementation. The orientation sensor 1007 can involve any form of gyroscope and/or accelerometer that is configured to measure any kind of orientation measurement, such as tilt angle, orientation with respect to x,y,z, access, acceleration (e.g., gravity) and so on in accordance with the desired implementation. Orientation sensor measurements can also involve gravity vector measurements to indicate the gravity vector of the device in accordance with the desired implementation.

Processor 1003 can be configured to transmit video from the camera and measurements from the orientation sensor 1007 to another device (e.g., such as the device illustrated in FIG. 11) through I/F 1006 as illustrated in FIGS. 1(b) and 2. As illustrated in FIG. 2, processor 1003 may receive hand information associated with a user hand from the another device; and overlay a representation of the user hand on the video for display by the mobile device based on the hand information, the representation of the user hand overlaid on the video in an orientation determined from the measurements from the orientation sensor 1007. In an example implementation involving live video as illustrated in FIG. 1(b) and as described herein, the video can be live video from the camera of the mobile device, the measurements can be live measurements from the orientation sensor, and the hand information can involve hand skeleton joint measurements and hand visualization parameters determined from live movements of the user hand as illustrated in FIGS. 4(a) to 4(c) and FIGS. 5(a) to 5(c).

In an example implementation, processor 1003 can be configured to overlay the representation of the user hand on the video for display by the mobile device (e.g., on display 1005) based on the hand information by generating a 3D hand model of the user hand as the representation based on the hand skeleton joint measurements, and adjust one or more of a color and a size of the 3D model as overlaid on the video based on one or more of hue information of the video and detected objects on the video as illustrated in FIGS. 5(a) to 5(c), 6(a), 6(b), 7(a), 7(b), and 8(a) and 8(b).

As illustrated in FIG. 2 and FIG. 3, processor 1003 can be configured to establish, through a web browser, a browser to browser connection from the mobile device to another web browser of the another device; wherein the processor 1003 is configured to transmit the video from the camera 1001 and the measurements from the orientation sensor 1007 to the another device, and receive hand information from the another device through the browser to browser connection.

As illustrated in FIG. 2, audio may be transmitted from the customer device or the expert device. In such an example implementation, processor 1003 can be configured to transmit (e.g., over I/F 1006) audio recorded from a microphone 1002 to the another device; and output audio received from the another device though any conventional sound speaker in accordance with the desired implementation.

As illustrated in FIG. 9, for example implementations involving previously recorded video, the video can be previously recorded video, and the measurements from the orientation sensor can be previously recorded measurements.

FIG. 11 illustrates an example of a system involving a tracking device, in accordance with an example implementation. The system can involve a device 1100 such as a computer, a laptop, a tablet, or other device in accordance with the desired implementation. Such a device can involve a camera 1101, a microphone 1102, a processor 1103, a memory 1104, a display 1005 and an interface (I/F) 1106, the hardware of which can be similar to that of mobile device 1000 of FIG. 10, or modified in accordance with the desired implementation.

Tracking device 1110 can involve sensors 1111 that can be configured to track motion, and can be in the form of any motion tracking sensor such as infrared, radio frequency, and so on. Tracking device 1110 can be configured to produce hand information such as hand skeleton joints and camera visualization parameters in accordance with any desired implementation that is compatible with Three.js.

As illustrated in FIG. 2, processor 1103 can be configured to receive video and orientation sensor measurements from a mobile device through I/F 1106, transmit hand information associated with a user hand from the another device, the hand information generated based on measurements obtained from the tracking device (e.g., from sensors 1111) as illustrated in FIGS. 4(*a*) to 4(*c*) and 5(*a*) to 5(*c*); and overlay a representation of the user hand on the video for display by the device based on the hand information, the representation of the user hand overlaid on the video in an orientation determined from the measurements from the orientation sensor as illustrated in FIGS. 1(*a*), 4(*a*) to 4(*c*), 5(*a*) to 5(*c*), 6(*a*), 6(*b*), 7(*a*), 7(*b*), 8(*a*) and 8(*b*). The orientation is determined from determining the gravity direction of the customer environment from the measurements of the orientation sensor.

Depending on the desired implementation, as illustrated in FIG. 1(*b*) and FIG. 2, the video can be live video from mobile device, the orientation sensor measurements can be live orientation sensor measurements from the mobile device, and the hand information can involve hand skeleton joint measurements and hand visualization parameters determined from live measurements of the user hand from the tracking device.

Depending on the desired implementation, processor 1103 can be configured to overlay the representation of the user hand on the video for display by the device based on the hand information by generating a 3D hand model of the user hand as the representation based on the hand skeleton joint measurements, and adjusting one or more of a color and a size of the 3D model as overlaid on the video based on one or more of hue information of the video and detected objects on the video as illustrated in FIGS. 6(*a*) to 6(*b*), 7(*a*) to 7(*b*) and 8(*a*) to 8(*b*).

As illustrated in FIG. 2 and FIG. 3, processor 1103 can be configured to establish, through a web browser, a browser to browser connection from the device to another web browser of the mobile device; wherein the receiving the video and the orientation sensor measurements from the mobile device, and the transmitting hand information from the device is conducted through the browser to browser connection.

Depending on the desired implementation, processor 1103 can be configured to transmit, over I/F 1106, audio recorded from a microphone 1102 to the mobile device; and output audio received from the mobile device though any conventional sound speaker in accordance with the desired implementation.

As illustrated in FIG. 9, the video can be previously recorded video, and the orientation sensor measurements are previously recorded orientation sensor measurements.

Figure 12:
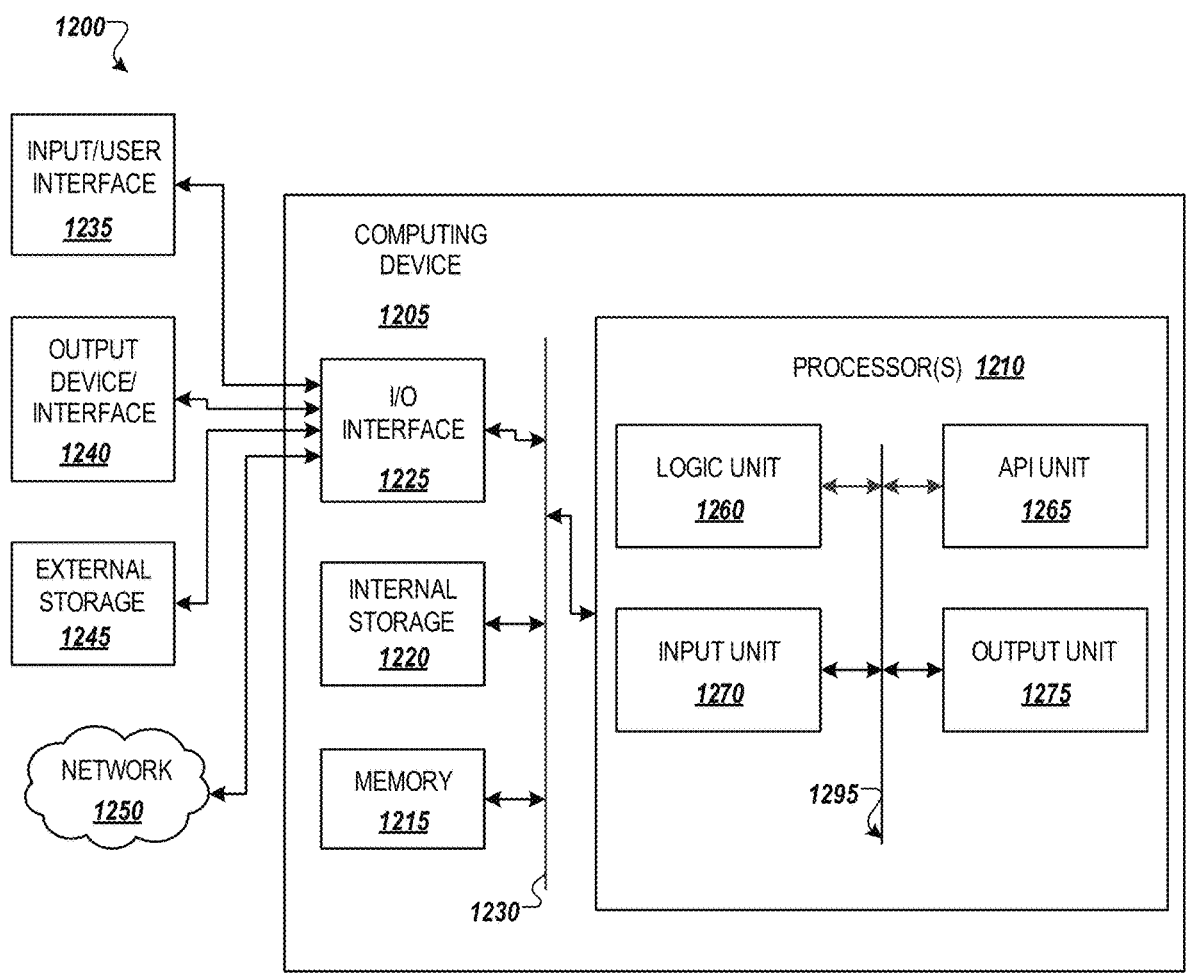
FIG. 12 illustrates an example computing environment with an example computer device suitable for use in some example implementations.

FIG. 12 illustrates an example computing environment with an example computer device suitable for use in some example implementations, such as a server (e.g., WebRTC Signaling Server 200) that establishes connections between the customer device and the established device. Computer device 1205 in computing environment 1200 can include one or more processing units, cores, or processors 1210, memory 1215 (e.g., RAM, ROM, and/or the like), internal storage 1220 (e.g., magnetic, optical, solid state storage, and/or organic), and/or I/O interface 1225, any of which can be coupled on a communication mechanism or bus 1230 for communicating information or embedded in the computer device 1205. I/O interface 1225 is also configured to receive images from cameras or provide images to projectors or displays, depending on the desired implementation.

Computer device 1205 can be communicatively coupled to input/user interface 1235 and output device/interface 1240. Either one or both of input/user interface 1235 and output device/interface 1240 can be a wired or wireless interface and can be detachable. Input/user interface 1235 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 1240 may include a display, television, monitor, printer, speaker, braille, or the like. In some example implementations, input/user interface 1235 and output device/interface 1240 can be embedded with or physically coupled to the computer device 1205. In other example implementations, other computer devices may function as or provide the functions of input/user interface 1235 and output device/interface 1240 for a computer device 1205.

Examples of computer device 1205 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 1205 can be communicatively coupled (e.g., via I/O interface 1225) to external storage 1245 and network 1250 for communicating with any number of networked components, devices, and systems, including one or more computer devices of the same or different configuration. Computer device 1205 or any connected computer device can be functioning as, providing services of, or referred to as a server, client, thin server, general machine, special-purpose machine, or another label.

I/O interface 1225 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 1200. Network 1250 can be any network or combination of networks (e.g., the Internet, local area network, wide area network, a telephonic network, a cellular network, satellite network, and the like).

Computer device 1205 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 1205 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C #, Java, Visual Basic, Python, Perl, JavaScript, and others).

Processor(s) 1210 can execute under any operating system (OS) (not shown), in a native or virtual environment. One or more applications can be deployed that include logic unit 1260, application programming interface (API) unit 1265, input unit 1270, output unit 1275, and inter-unit communication mechanism 1295 for the different units to communicate with each other, with the OS, and with other applications (not shown). The described units and elements can be varied in design, function, configuration, or implementation and are not limited to the descriptions provided. Processor(s) 1210 can be in the form of hardware processors such as central processing units (CPUs) or in a combination of hardware and software units.

In some example implementations, when information or an execution instruction is received by API unit 1265, it may be communicated to one or more other units (e.g., logic unit 1260, input unit 1270, output unit 1275). In some instances, logic unit 1260 may be configured to control the information flow among the units and direct the services provided by API unit 1265, input unit 1270, output unit 1275, in some example implementations described above. For example, the flow of one or more processes or implementations may be controlled by logic unit 1260 alone or in conjunction with API unit 1265. The input unit 1270 may be configured to obtain input for the calculations described in the example implementations, and the output unit 1275 may be configured to provide output based on the calculations described in example implementations.

As illustrated in FIG. 2 and FIG. 3, processor(s) 1210 can be configured to receive a first connection from a mobile device (e.g., through a browser and a selection of the "I am a Customer" button of FIG. 3), receive a second connection from another device communicatively coupled to a tracking device (e.g., through a browser and a selection of the "I am an Expert" button of FIG. 3); and establish a third connection between the mobile device and the another device to facilitate transmission of video and orientation sensor measurements from the mobile device to the another device and to facilitate transmission of hand information from the another device to the mobile device as illustrated in FIG. 2. As illustrated in FIG. 3 the first connection and the second connection can be received through a web browser, wherein the establishing the third connection involves establishing a direct browser-to-browser connection between the mobile device of FIG. 10 and the another device such as the system of FIG. 11.

As illustrated in FIGS. 1(*a*), 1(*b*) and 2, the video can be live video from mobile device, the orientation sensor measurements can be live orientation sensor measurements from the mobile device, and the hand information can involve hand skeleton joint measurements and hand visualization parameters determined from live measurements of the user hand from the tracking device.

As illustrated in FIG. 9, the video can be previously recorded video, and the orientation sensor measurements can be previously recorded orientation sensor measurements.

Although example implementations are described herein with respect to measuring a user hand, the example implementations can be extended to objects other than a user hand (e.g., user foot, a stylus, any kind of tool), in accordance with the desired implementation, so long as the form of the object is known and can be converted into skeleton joints and visualization parameters to facilitate the desired implementation.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A non-transitory computer readable medium, storing instructions for executing a process for a mobile device comprising an orientation sensor and a camera, the instructions comprising:
   transmitting video from the camera and measurements from the orientation sensor to another device;
   receiving, from the another device, hand information associated with a user hand in a real-world interaction space, the hand information comprising a vertical direction of the real-world interaction space indicative of ground of the real-world interaction space;
   determining a gravity direction of a real-world environment represented in the video from the camera based on the measurements from the orientation sensor, the gravity direction of the real-world environment indicative of ground of the real-world environment;
   aligning a gravity direction of the video from the camera to the ground of the real-world environment represented in the video from the camera;
   matching the vertical direction of the real-world interaction space included in the hand information to the gravity direction of the video; and
   overlaying a representation of the user hand on the video for display by the mobile device based on the hand information, the representation of the user hand overlaid on the video in an orientation determined from the measurements from the orientation sensor and the matching of the vertical direction to the gravity direction of the video, wherein overlaying the representation of the user hand on the video for display by the mobile device comprises, based on the measurements from the orientation sensor, moving the representation of the user hand on the video for display to match with movements of the user hand in the real-world interaction space included in the hand information based, in part, on the matching of the vertical direction to the gravity direction of the video.

2. The non-transitory computer readable medium of claim 1, wherein the video is live video from the camera of the mobile device, the measurements are live measurements from the orientation sensor, and the hand information comprises hand skeleton joint measurements and hand visualization parameters determined from live movements of the user hand.

3. The non-transitory computer readable medium of claim 2, wherein the overlaying the representation of the user hand on the video for display by the mobile device based on the hand information comprises generating a 3D hand model of the user hand as the representation based on the hand skeleton joint measurements, and adjusting one or more of a color and a size of the 3D model as overlaid on the video based on one or more of hue information of the video and detected objects on the video.

4. The non-transitory computer readable medium of claim 3, wherein adjusting a size of the 3D model as overlaid on the video is based on estimating a size of detected objects in vicinity of a portion of the 3D model as overlaid on the video.

5. The non-transitory computer readable medium of claim 1, the instructions further comprising:
   establishing, through a web browser, a browser to browser connection from the mobile device to another web browser of the another device;
   wherein the transmitting the video from the camera and the measurements from the orientation sensor to the another device, and the receiving hand information from the another device is conducted through the browser to browser connection.

6. The non-transitory computer readable medium of claim 1, wherein the instructions further comprises:
   transmitting audio recorded from a microphone to the another device; and
   outputting audio received from the another device.

7. The non-transitory computer readable medium of claim 1, wherein the video is previously recorded video, wherein the measurements from the orientation sensor are previously recorded measurements.

8. The non-transitory computer readable medium of claim 1, wherein the instructions further comprise:
   adjusting a color of the representation of the user hand as overlaid on the video based on calculating an average hue value in the video proximal to the representation of the user hand as overlaid on the video and determining a complementary hue value from the average hue value, the color corresponding to the complementary hue value.

9. A non-transitory computer readable medium, storing instructions for executing a process for a device communicatively coupled to a tracking device, the instructions comprising:
   receiving video and orientation sensor measurements from a mobile device;
   transmitting hand information associated with a user hand from the another device, the hand information generated based on measurements obtained from the tracking device in a real-world interaction space, the hand information comprising a vertical direction of the real-world interaction space indicative of ground of the real-world interaction space;
   determining a gravity direction of a real-world environment represented in the video from the camera based on the measurements from the orientation sensor, the gravity direction of the real-world environment indicative of ground of the real-world environment;
   aligning a gravity direction of the video from the camera to the ground of the real-world environment represented in the video from the camera;
   matching the vertical direction of the real-world interaction space included in the hand information to the gravity direction of the video; and
   overlaying a representation of the user hand on the video for display by the device based on the hand information, the representation of the user hand overlaid on the video in an orientation determined from the measurements from the orientation sensor and the matching of the vertical direction to the gravity direction of the video, wherein overlaying the representation of the user hand on the video for display by the mobile device comprises, based on the measurements from the orientation sensor, moving the representation of the user hand on the video for display to match with movements of the user hand in the real-world interaction space included in the hand information based, in part, on the matching of the vertical direction to the gravity direction of the video.

10. The non-transitory computer readable medium of claim 9, wherein the video is live video from mobile device, the orientation sensor measurements are live orientation sensor measurements from the mobile device, and the hand information comprises hand skeleton joint measurements and hand visualization parameters determined from live measurements of the user hand from the tracking device.

11. The non-transitory computer readable medium of claim 10, wherein the overlaying the representation of the user hand on the video for display by the device based on the hand information comprises generating a 3D hand model of the user hand as the representation based on the hand skeleton joint measurements, and adjusting one or more of a color and a size of the 3D model as overlaid on the video based on one or more of hue information of the video and detected objects on the video.

12. The non-transitory computer readable medium of claim 9, the instructions further comprising:
establishing, through a web browser, a browser to browser connection from the device to another web browser of the mobile device;
wherein the receiving the video and the orientation sensor measurements from the mobile device, and the transmitting hand information from the device is conducted through the browser to browser connection.

13. The non-transitory computer readable medium of claim 9, wherein the instructions further comprises:
transmitting audio recorded from a microphone to the mobile device; and
outputting audio received from the mobile device.

14. The non-transitory computer readable medium of claim 9, wherein the video is previously recorded video, wherein the orientation sensor measurements are previously recorded orientation sensor measurements.

15. A non-transitory computer readable medium, storing instructions for a server, the instructions comprising:
receiving a first connection from a mobile device;
receiving a second connection from another device communicatively coupled to a tracking device;
establishing a third connection between the mobile device and the another device to facilitate transmission of video and orientation sensor measurements from the mobile device to the another device and to facilitate transmission of hand information from the another device to the mobile device, wherein the hand information comprises movements of a user hand in a real-world interaction space from the tracking device, the hand information comprising a vertical direction of the real-world interaction space indicative of ground of the real-world interaction space, and, based on the orientation sensor measurements, moving a representation of the user hand on a video for display on the mobile device to match with movements of the user hand included in the hand information, the hand information further comprising a color for displaying the hand on a display of the mobile device,
wherein a gravity direction of a real-world environment represented in the video from the camera is determined based on the measurements from the orientation sensor, the gravity direction of the real-world environment indicative of ground of the real-world environment,
wherein a gravity direction of the video from the camera is aligned to the ground of the real-world environment represented in the video from the camera, and
wherein the vertical direction of the real-world interaction space included in the hand information is matched to the gravity direction of the video, and the moving of the representation of the user hand on the video is based, in part, on the matching of the vertical direction to the gravity direction of the video.

16. The non-transitory computer readable medium of claim 15, wherein the first connection and the second connection are received through a web browser, wherein the establishing the third connection comprises establishing a direct browser-to-browser connection between the mobile device and the another device.

17. The non-transitory computer readable medium of claim 15, wherein the video is live video from mobile device, the orientation sensor measurements are live orientation sensor measurements from the mobile device, and the hand information comprises hand skeleton joint measurements and hand visualization parameters determined from live measurements of the user hand from the tracking device.

18. The non-transitory computer readable medium of claim 15, wherein the video is previously recorded video, wherein the orientation sensor measurements are previously recorded orientation sensor measurements.

* * * * *